(12) United States Patent
Li

(10) Patent No.: US 7,239,230 B2
(45) Date of Patent: Jul. 3, 2007

(54) RADAR SENSOR FOR REVERSING A VEHICLE AND HAVING FINE-TUNING FUNCTION

(76) Inventor: Shih-Hsiung Li, 2F-7, No. 23, Sec. 1, Hangchow S. Rd., Taipei (TW)

( * ) Notice: Subject to any disclaimer, the term of this patent is extended or adjusted under 35 U.S.C. 154(b) by 349 days.

(21) Appl. No.: 11/051,199

(22) Filed: Feb. 4, 2005

(65) Prior Publication Data
US 2006/0176212 A1 Aug. 10, 2006

(51) Int. Cl.
*B60Q 1/00* (2006.01)
(52) U.S. Cl. ............ 340/435; 340/436; 340/903; 701/301
(58) Field of Classification Search ......... 340/435, 340/436, 901, 903, 904; 293/117, 155; 180/271, 180/274; 701/301; 342/70; 73/629, 644; 367/909
See application file for complete search history.

(56) References Cited

U.S. PATENT DOCUMENTS

| 5,844,471 | A  | * | 12/1998 | Daniel ............... 340/436 |
| 6,044,632 | A  | * | 4/2000  | Schmalz et al. ..... 340/435 |
| 6,173,233 | B1 | * | 1/2001  | Janutka et al. ..... 701/301 |
| 6,203,366 | B1 | * | 3/2001  | Muller et al. ...... 439/561 |
| 6,279,210 | B1 | * | 8/2001  | Faass et al. ........ 24/457 |
| 6,282,969 | B1 | * | 9/2001  | Daniel .............. 367/93 |
| 6,340,187 | B1 | * | 1/2002  | Villiere et al. .... 293/155 |
| 6,615,121 | B2 | * | 9/2003  | Li .................. 340/903 |
| 6,693,520 | B2 | * | 2/2004  | Li .................. 340/435 |
| 6,788,190 | B2 | * | 9/2004  | Bishop .............. 340/435 |
| 6,902,215 | B1 | * | 6/2005  | Condeelis .......... 293/117 |
| 7,012,510 | B2 | * | 3/2006  | Su et al. .......... 340/436 |
| 7,084,744 | B2 | * | 8/2006  | Li .................. 340/435 |
| 7,110,324 | B2 | * | 9/2006  | Ho et al. .......... 340/435 |
| 2005/0230581 | A1 | * | 10/2005 | Gau ............... 248/229.1 |

FOREIGN PATENT DOCUMENTS

| DE | 19934197 A1 | 1/2001 |
| DE | 202004009110 U1 | 10/2004 |
| EP | 0957531 A1 | 3/1999 |

* cited by examiner

Primary Examiner—John Tweel, Jr.
(74) Attorney, Agent, or Firm—James H. Walters

(57) ABSTRACT

A radar sensor for a vehicle and having a fine-tuning function includes a base forming a chamber to pivotably receive a sensor module. The sensor module can be adjusted in its pantoscopic angle and direction, so as to set a sensing range accurately. A packing block is configured at an inner wall of the chamber, which can be controlled by an adjustment part configured at a surface of the base. When an operator adjusts the sensor to an appropriate angle, the adjustment part at the surface of the base can pack the sensor, so as to achieve an objective securing the sensor module in a desired position.

12 Claims, 7 Drawing Sheets

RADAR SENSOR FOR REVERSING A VEHICLE AND HAVING FINE-TUNING FUNCTION

BACKGROUND OF THE INVENTION

1. Field of the Invention

The invention relates in general to a radar sensor for reversing a vehicle and having a fine-tuning function, and more particularly to a radar sensor for reversing a vehicle, wherein a sensing angle can be finely tuned after installation.

2. Description of the Related Art

Advances in radar electronics and increasing awareness in road safety have resulted in the development of radar devices for vehicles such as cars and trucks. In particular, such vehicles are fitted with radar to assist in reversing the vehicle safely. The radar for reversing the vehicle provides information to a driver to learn whether an obstacle exists behind by transmitting and receiving reflected ultrasonic waves, so as to back up or park the vehicle successfully. Some drivers even fit a video camera at the rear of the vehicle to acquire an optimum understanding of a rear road condition by the video. Both the ultrasonic waves and the video camera feature an accurate sensing range of a sensing component. Therefore how to complete an accurate setting for a sensing range is an important issue.

However, the conventional radar reversing-assistance products do not provide a function for fine-tuning after installation. Therefore the drivers need to adjust and even refit through trial and error the radar several times to achieve an optimal angle, which is troublesome, disappointing, and even dangerous as a layperson may not achieve the appropriate range.

SUMMARY OF THE INVENTION

It is therefore an objective of the present invention to provide a radar sensor for vehicle-reversing and having a fine-tuning function, which can fine-tune a sensing angle after installation of the radar to the vehicle.

In order to achieve the above-mentioned objective, a radar sensor for vehicle-reversing and having a fine-tuning function is provided. The radar sensor having a fine-tuning function includes a base, a sensor module, a brake and an adjustment part. A round chamber is formed above the base, and also a component room is formed at a corresponding location of the chamber. The component room includes a first opening and a second opening. The first opening communicates with an exterior surface of the base, and the second opening communicates the chamber with the component room. The second opening includes a packing block inside the second opening. The sensor module includes a truncated sphere for mating with a substantially spherical interior of the chamber correspondingly, so as to provide adjustment of a pantoscopic angle and direction. The brake is configured inside the component room and corresponds to an inner side of the packing block. The adjustment part is configured at the second opening of the base and coupled to the brake.

In this way, when the above-mentioned radar sensor is fitted at a rear of a vehicle, the pivoting of the sensor module relative to the base can be used to fine-tune an angle of the sensor module. After tuning to an appropriate angle, the adjustment part can be operated through the exterior surface of the base, so as to control a movement of the brake. Thereby the brake pushes the packing block upwards, so that the sensor module is secured at a desired position inside the chamber of the base. Therefore, even if the above-mentioned car-reversing radar sensor has been installed on the car, the special-designed structure on the sensor still permits convenient fine-tuning of the angle of the sensor.

DETAILED DESCRIPTION OF THE INVENTION

Figure 1:
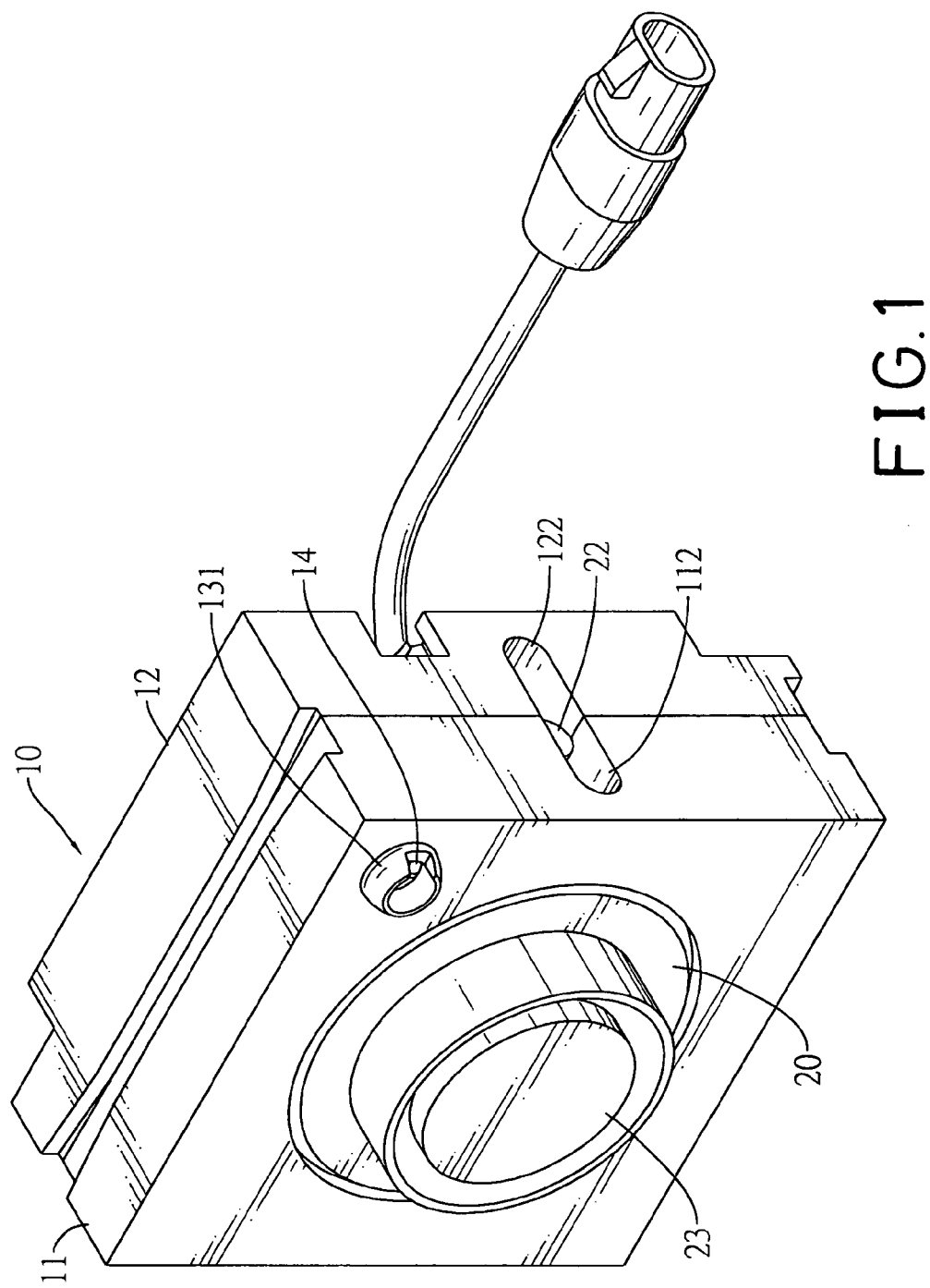
FIG. 1 is a perspective view of an assembled radar sensor with fine tuning function in accordance with the present invention.

Referring to FIG. 1, a radar sensor for vehicle reversing includes a base 10 and a sensor module 20 with a truncated spherical body. The sensor module 20 permits change of a sensing angle with a super wide-angle manner within the base 10, and also can be locked by an adjustment part installed at an exterior surface of the base 10, which is not shown in the diagram, so as to facilitate fine-tuning of an angle after installation of the radar sensor. The following description provides a detailed embodiment structure regarding to an example of a preferred embodiment of the present invention.

Figure 2:
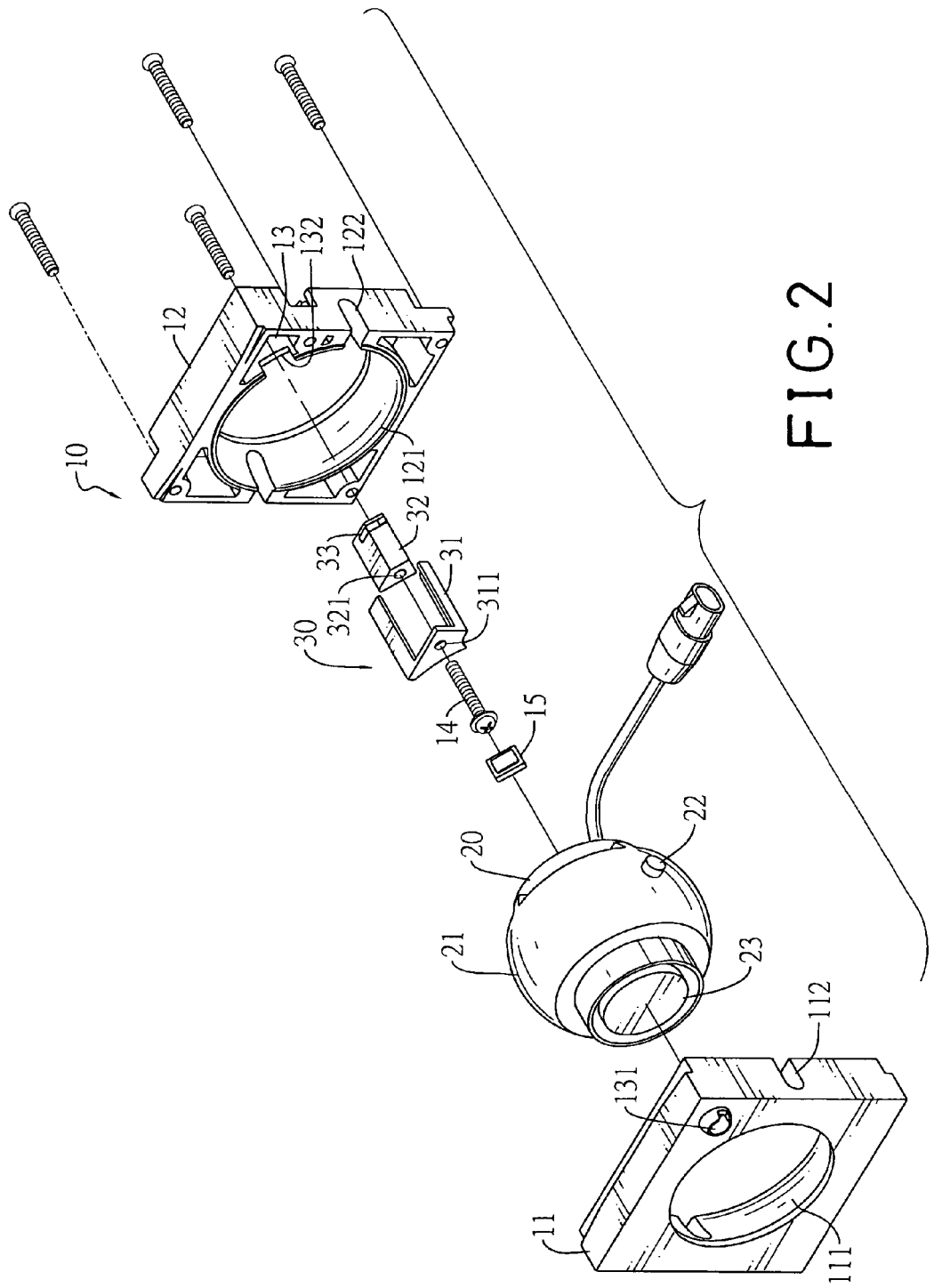
FIG. 2 is an exploded perspective view of the radar sensor in FIG. 1.

Referring to FIG. 2, a preferred embodiment of the present invention includes the base 10 having a front housing 11 and an back housing 12 combinable to form the base 10. A corresponding first circular opening 111 and a corresponding second circular opening 121 are formed on the front housing 11 and the back housing 12 respectively. The first circular opening 111 has an arcuate periphery and the second opening 121 has an arcuate periphery the mirror image of the first circular periphery 111 such that when the front and back housings 11,12 are combined, a truncated spherical chamber is defined to matingly receive therein the truncated sphere of the sensor module 20. Moreover, the front housing 11 and the back housing 12 respectively define two first slots 112 and two second slots 122 on opposed sides of lateral walls. Each slot 112,122 has an open end such that when the housings 11,12 are combined, the open ends of first slots 112 respectively align with the open ends of the second slots 122 to define two corridors which respectively receive pivot stubs 22 protruding from diametrically opposed points of the sensor module 20.

Figure 3:
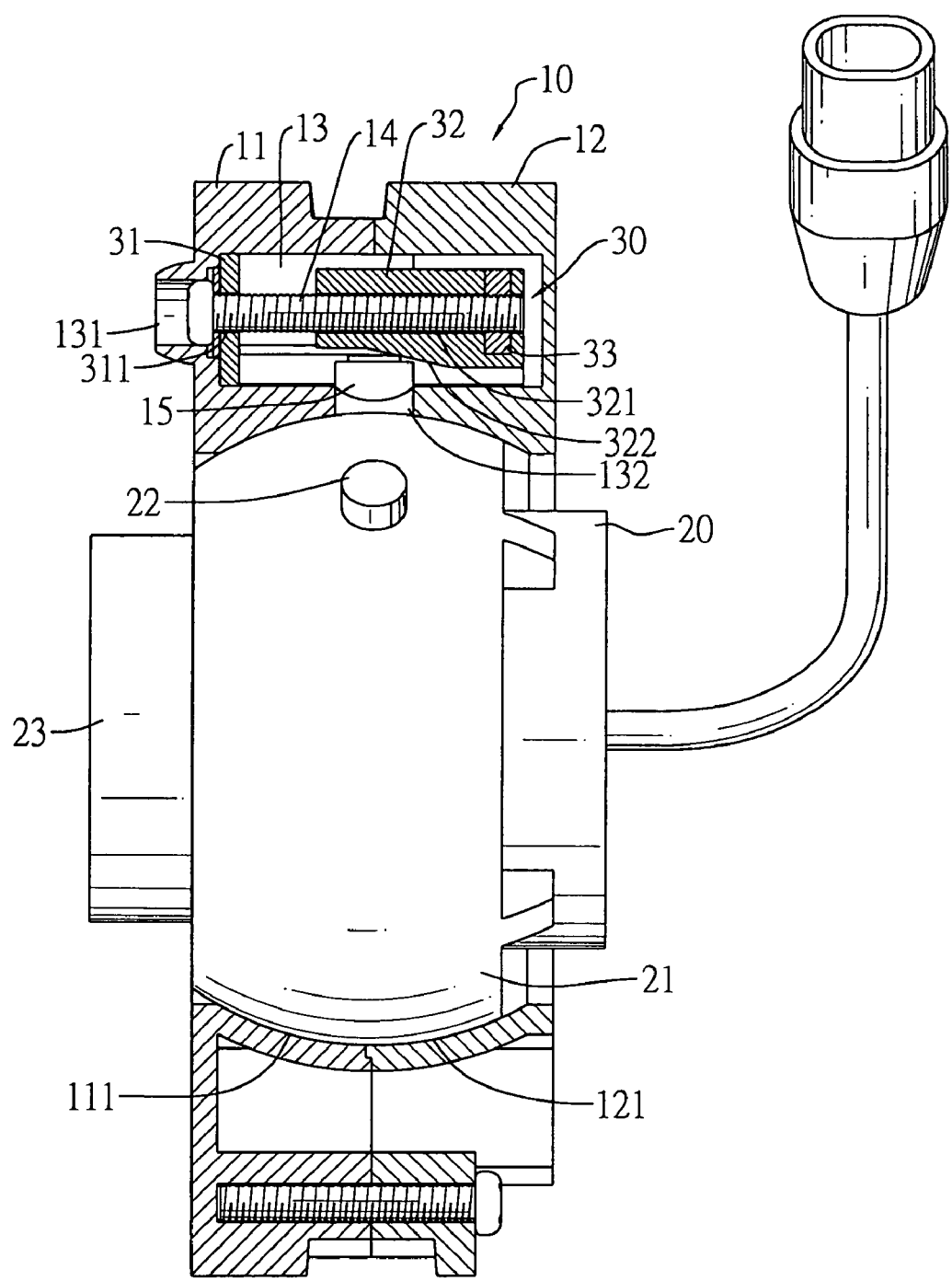
FIG. 3 is a side view in partial cross section of the radar sensor of FIG. 1, in an unlocked mode.

Referring to FIG. 3, a top right corner of the first housing 11 and a corresponding top left corner of the second housing 12 define a space respectively, so as to form a component room 13 when the housings 11,12 are combined. The component room 13 includes a first aperture 131 and a second aperture 132 perpendicular to the first aperture 131. The first aperture 131 has an exit leading out to the end face of the first housing 11. The second aperture 132 has an exit leading to the arcuate periphery of the first housing 11, and includes a packing block 15. An adjustment part 14 is configured at the second aperture 132. In this preferred embodiment, the adjustment part 14 is a screw.

Further, a brake 30 is configured inside the component room 13. The brake 30 includes a frame 31 for a brake shoe 32 to slide backward and forward on the frame. The frame 31 forms a hole 311 on a lateral wall opposite to the first aperture 131, and brake shoe 32 has a hole 321 that is parallel to a long side of the brake shoe 32 and corresponding to the hole 311 of the frame 31. The brake shoe 32 includes a breach at an end, and the breach includes a notch 33 having a screw hole, which is corresponding to the hole 321 of the brake shoe 32. In this way, the adjustment part 14 inside the first aperture 131 can go through the hole 311 and the hole 321 of the frame 31 and the brake shoe 32 in sequence, so as to connect with the notch 33 by a screw connection manner. The brake shoe 32 has an inclined wall 322 opposite to a lateral wall of the second aperture 132. When the adjustment part 14 is rotated and counter-rotated respectively causing the brake shoe 32 to move forward and backward, so that the brake shoe 32 can push the packing block 15 inside the round chamber.

Still referring to FIG. 2 and FIG. 3, the sensor module 20 includes the sensor installed inside a body, wherein the body includes the truncated sphere 21 for mating with the chamber of the base 10. The stubs 22 provide a range of pivot of the sensor and truncated sphere 21. Moreover, the sensor module 20 includes a sensing terminal 23. The sensing terminal 23 protrudes beyond the first opening 111 of the front housing 11. A sensor component is installed inside the sensing terminal 23. The sensor component can be an ultrasonic transmitter/receiver or an image capture component, and the like.

Figure 4:
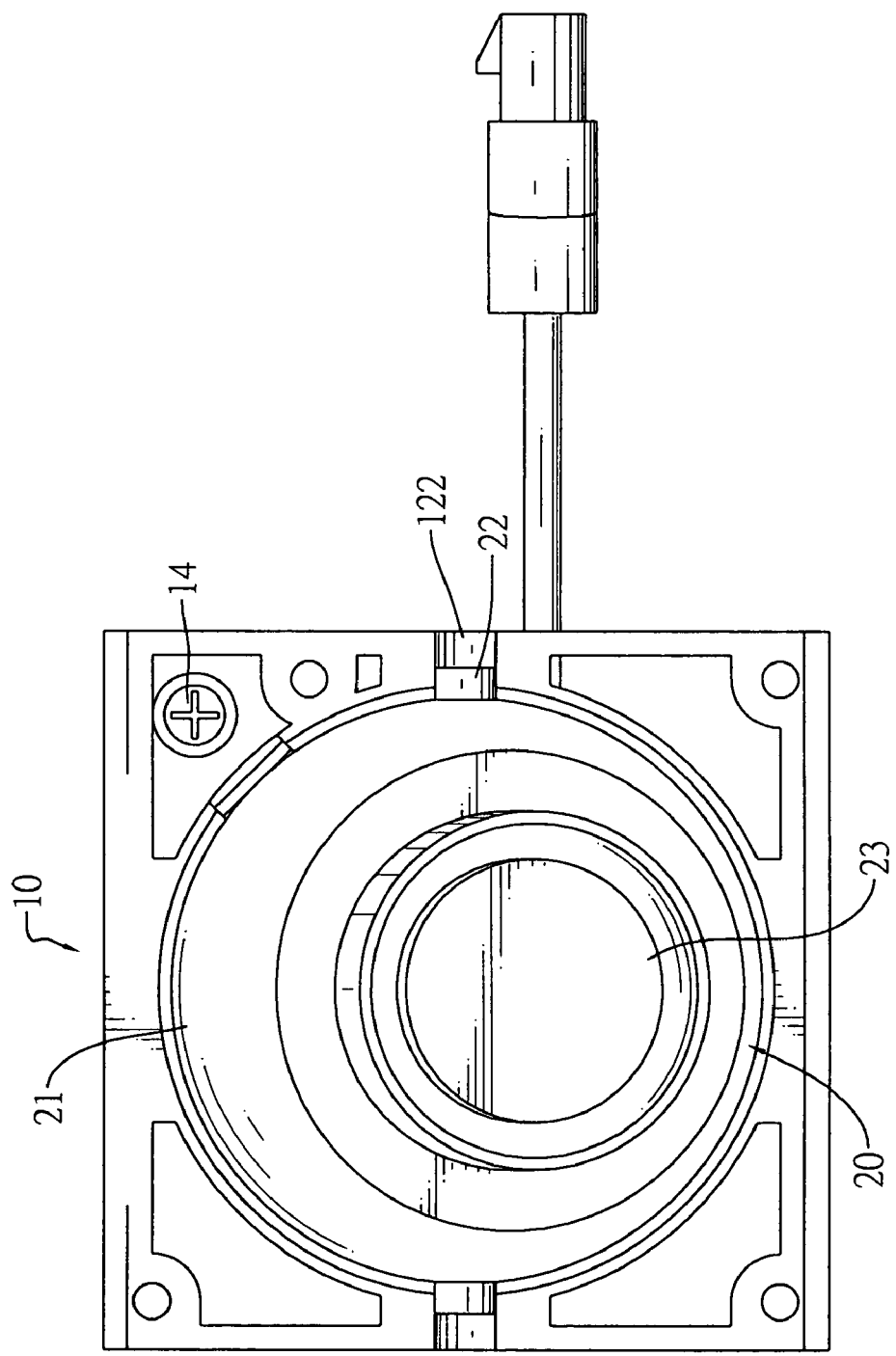
FIG. 4 is a front view of the radar sensor of FIG. 1, in a first setting.
Figure 5:
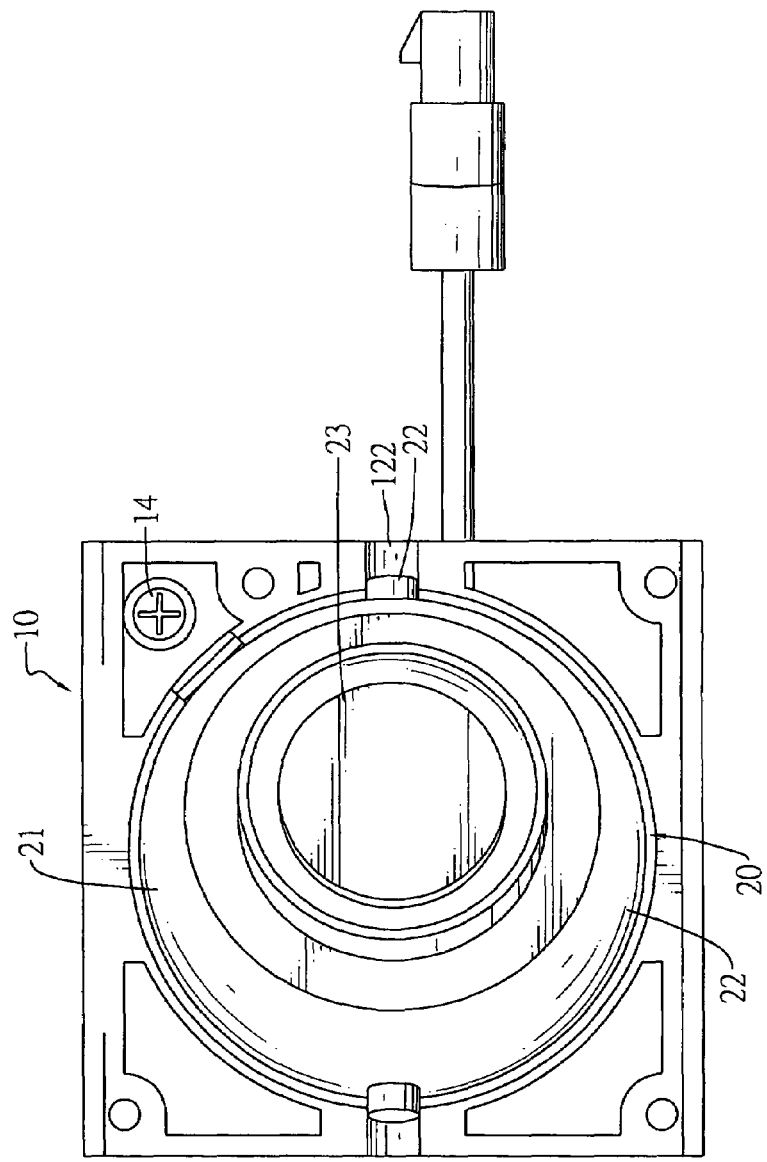
FIG. 5 is another front view of the radar sensor of FIG. 1 in a second setting.
Figure 6:
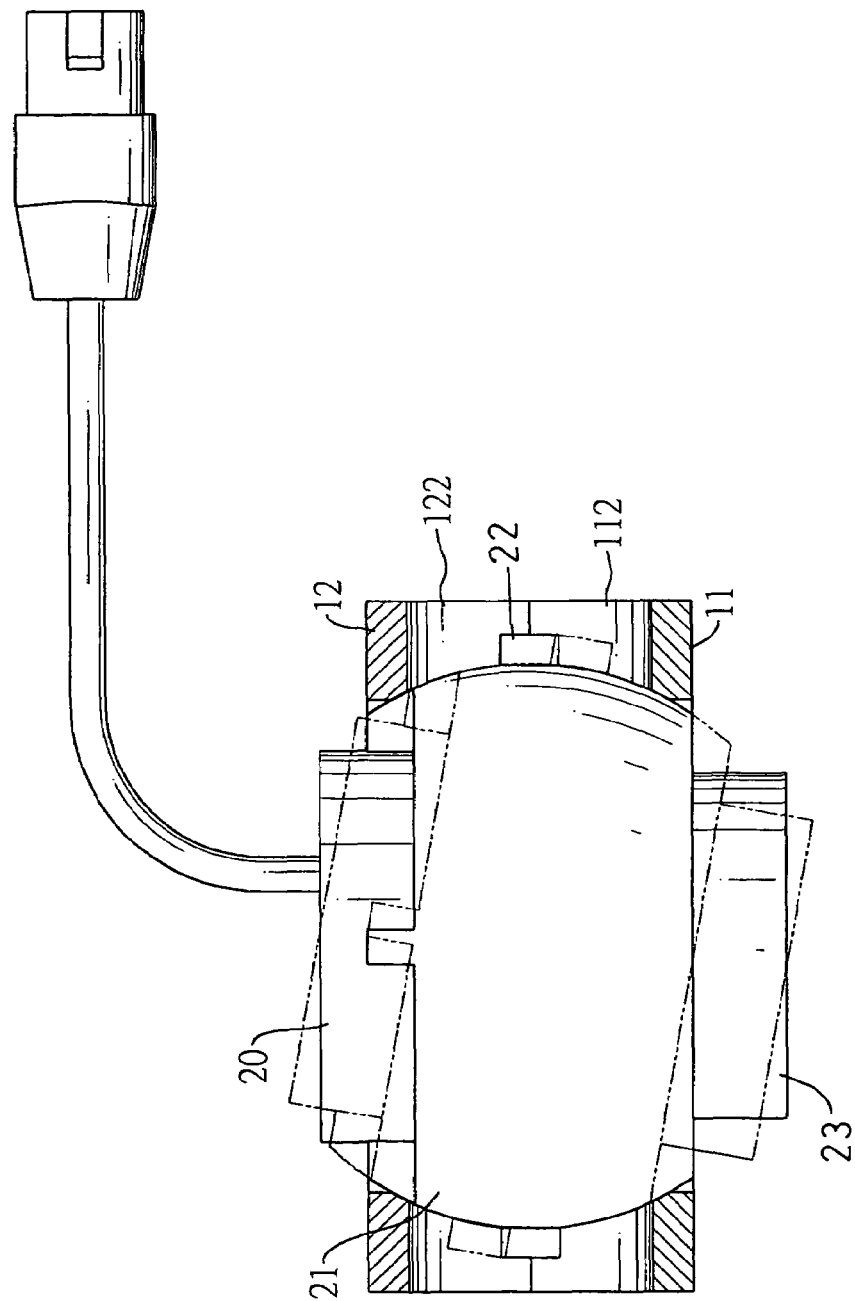
FIG. 6 is an end view of the radar sensor showing a first setting in phantom lines and a second setting in solid lines.
Figure 7:
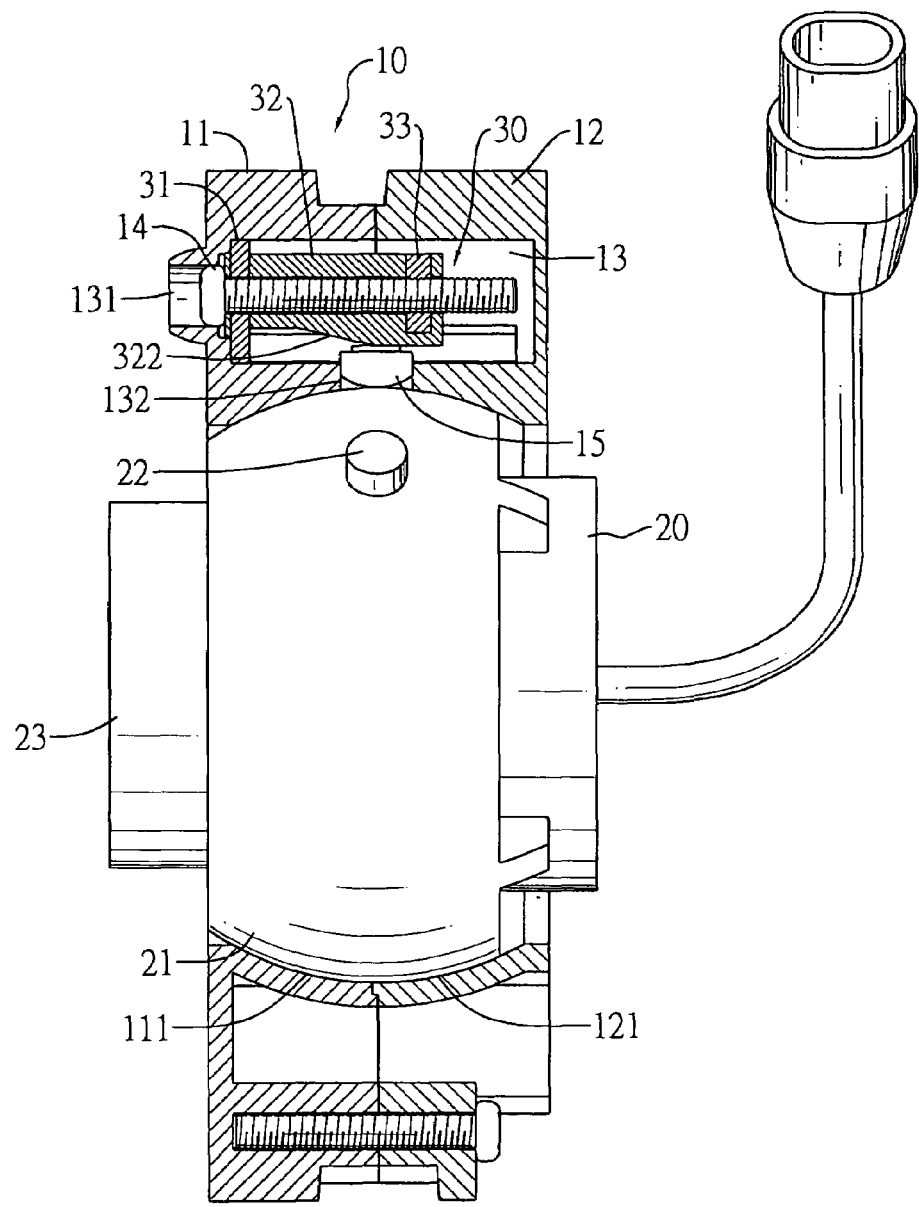
FIG. 7 is a side view in partial cross section of the radar sensor of FIG. 1, in a locked mode.

After each of the above-mentioned components is combined, the example of the preferred embodiment of the present invention is shown as FIG. 1 and FIG.3. Before the sensor of the present invention is installed, the adjustment part 14 remains motionless in the beginning. The movement block 23 is located at the inner side of the component room 13, which does not push the packing block 15. At this moment, the packing block 15 is located inside the second opening 132. After the complete installation of the sensor, the angle of the sensor module 20 can be adjusted. Since the packing block 15 is not yet operational, the truncated sphere 21 of the sensor module 20 and the chamber of the base 10 are not secured immovably to each other, so that the sensor module 20 can be moved liberally. FIG. 4, FIG. 5 and FIG. 6 illustrate variations of movement of the truncated sphere 21 relative to the base 10. After performing adjustments to a fix position, the adjustment part 14 installed on the external surface of the front housing 11 inside the first opening 131 can be moved around. At this moment, the movement block 32 inside the component room 13 is pushed forward, so that the shoe 32 pushes the packing block 15 upwards inside the second aperture 132, as shown in FIG. 7. The packing block 15 thus engagingly abuts the truncated sphere 21 of the sensing module 20. Thereby the sensing scope is well tuned and locked.

In conclusion, the present invention contributes to the radar sensor having a fine-tuning function whereby a pantoscopic angle and direction of the sensor module can be adjusted. The base further includes a brake to work in coordination with the adjustment part, which is an external control of the base, so as to lock the sensor module at the adjusted angle and direction. Since an operation location of a lock mechanism is at the exterior of the base, the angle of the sensing sensor can be conveniently fine tuned after installation to make the sensing range accurate.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A radar sensor for a vehicle and having a fine-tuning function comprising:
   a base defining a chamber, and also forming a component room at a corresponding location of the chamber, wherein the component room comprises a first aperture and a second aperture, wherein the first aperture exits at an exterior surface of the base, wherein the second aperture exits into the chamber and communicates with the first aperture, and wherein the second aperture comprises a packing block inside the second aperture;
   a sensor module pivotably received inside the chamber; a brake configured inside the component room and corresponding to an inner side of the packing block; and
   an adjustment part configured at the second aperture of the base and coupled to the brake.

2. The radar sensor for vehicle-reversing and having a fine-tuning function as claimed in claim 1, wherein the adjustment part is a screw; wherein the brake comprises at least a shoe connected with the adjustment part by a screw connection manner; and wherein the shoe forms a pushing slant wall opposite to a lateral wall of the chamber, which is corresponding to the packing block inside the second aperture.

3. The radar sensor for vehicle-reversing and having a fine-tuning function as claimed in claim 2, wherein the brake further comprises a frame in a form of an external space of the component room for the shoe to slide backward and forward on the frame; wherein the frame forms a hole on a lateral wall opposite to the first aperture and forms a corresponding hole on the shoe separately, so as to provide for the adjustment part to penetrate; wherein the shoe comprises a breach at an end, and wherein the breach comprises a notch having a screw hole for a screw connection of the shoe and the adjustment part.

4. The radar sensor for vehicle-reversing and having a fine-tuning function as claimed in claim 1, wherein the base comprises a front housing and a back housing to form the base, wherein a corresponding first opening and a corresponding second opening are formed on the front housing and the back housing respectively, and wherein a periphery of the first opening and a second periphery of the second opening ditch are arcuate, so as to form a substantially spherical chamber when the front and back housings are combined together.

5. The radar sensor for vehicle-reversing and having a fine-tuning function as claimed in claim 3, wherein the base comprises a front housing and a back housing to form the base, wherein a first opening and a second opening are formed on the front housing and the back housing respectively, and wherein a first periphery of the first opening and a second periphery of the second opening are arcuate, so as to form a substantially spherical chamber when the front and back housings are combined together.

6. The radar sensor for vehicle-reversing and having a fine-tuning function as claimed in claim 4, wherein each of the front and back housing forms a space, so as to form the component room when the front and back housing are combined together.

7. The radar sensor for vehicle-reversing and having a fine-tuning function as claimed in claim 5, wherein the front housing and the back housing each of the front and back housing forms a space, so as to form the component room when the front and back housing are combined together.

8. The radar sensor for vehicle-reversing and having a fine-tuning function as claimed in claim 6, wherein the front housing and the back housing each define a slot in each of two opposed sidewalls, and wherein two stubs extending from the truncated sphere in diametrically opposed positions respectively engage in the slots, so as to pivot the truncated sphere in on the front housing and the back housing.

9. The radar sensor for vehicle-reversing and having a fine-tuning function as claimed in claim 7, wherein the front housing and the back housing each define a slot in each of two opposed sidewalls, and wherein two stubs extending from the truncated sphere in diametrically opposed positions respectively engage in the slots, so as to pivot the truncated sphere on the front housing and the back housing.

10. The radar sensor for vehicle-reversing and having a fine-tuning function as claimed in claim 1, wherein the sensor module comprises a sensing terminal, and wherein a sensor component is installed inside the sensing terminal.

11. The radar sensor for vehicle-reversing and having a fine-tuning function as claimed in claim 10, wherein the sensor component is an ultrasonic transmitter/receiver.

12. The radar sensor for vehicle-reversing and having a fine-tuning function as claimed in claim 10, wherein the sensor component is an image capture component.

* * * * *